Aug. 1, 1961    C. V. MULLEN, JR    2,994,101
PRILLING OF MOLTEN SOLIDS
Filed Feb. 2, 1959
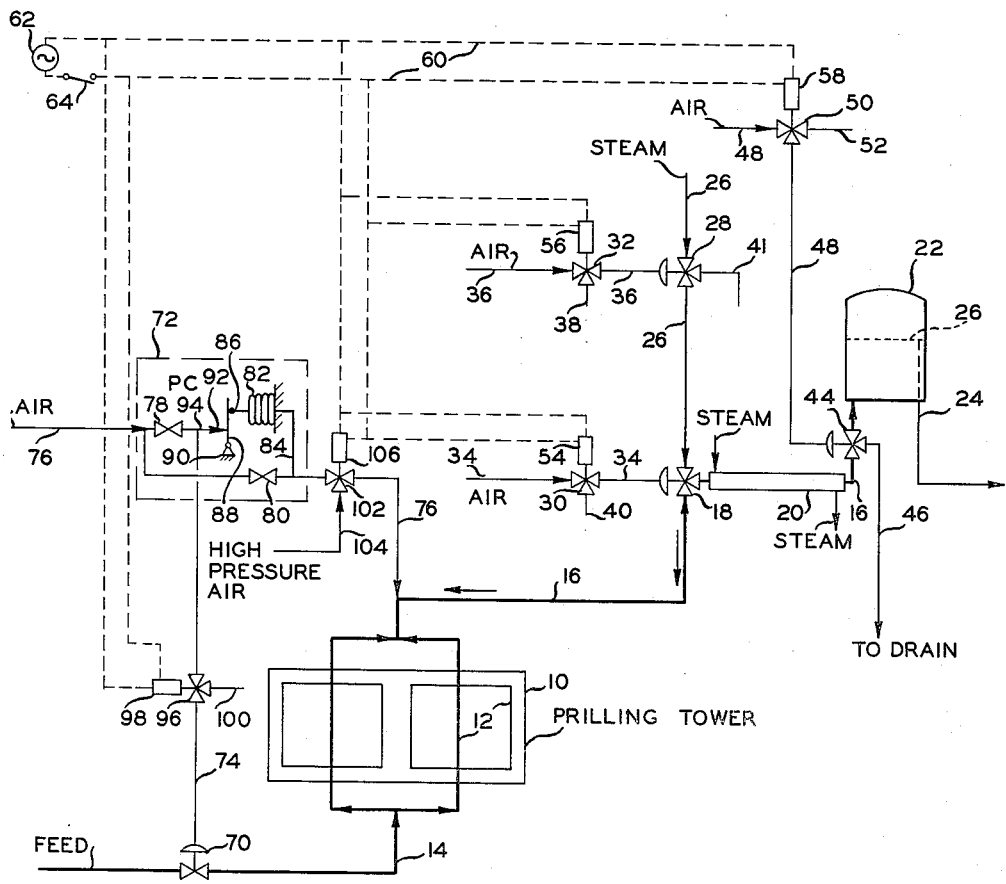
INVENTOR.
C. V. MULLEN, JR.
BY Hudson & Young
ATTORNEYS

United States Patent Office 2,994,101
Patented Aug. 1, 1961

2,994,101
PRILLING OF MOLTEN SOLIDS
Charles V. Mullen, Jr., Dumas, Tex., assignor to Phillips Petroleum Company, a corporation of Delaware
Filed Feb. 2, 1959, Ser. No. 790,626
13 Claims. (Cl. 18—2.4)

This invention relates to a process and apparatus for prilling molten solids.

The prilling of molten solids to provide small granules or prills of the solid material when cooled to atmospheric temperatures is a conventional practice well known in the art. Ammonium nitrate is a good illustration of a commercial product which is sold in prill form and is prilled by introducing a concentrated molten solution of the material into the top of a tower by spraying the solution thru small orifices to form droplets and permitting the droplets to gravitate thru a cooling tower countercurrently to an upwardly directed current of cool air. During the fall the droplets become substantially spherical and solidify in this form before reaching the bottom of the tower, in which the resulting prills or granules are collected and from which they are removed in desired manner.

One of the requirements of good grade ammonium nitrate prills is substantial uniformity in prill size. It has been found that vibrating the prilling conduits at a regular vibration rate during the prilling process greatly aids in the uniformity of the prills being produced. However, even where the conduits thru which the melt is sprayed are mechanically vibrated at a constant rate, the size of the prills will vary if the pressure in the melt being sprayed is allowed to vary.

Another problem involved in prilling a normally solid melt is the solidification or freezing of the melt in the conduits and lines of the prilling apparatus when temporarily terminating the prilling process for any reason. If the melt freezes in the conduits and lines, it is necessary to apply heat over substantially the entire circuit of the melt before resuming the prilling process. This is time consuming and uneconomical.

The invention is therefore concerned with a prilling apparatus which prevents the freezing of melt in the prilling lines and conduits and also with a process and apparatus which effects the production of more nearly uniform prills.

It is a principal object of the invention to provide apparatus for preventing the freezing of normally solid melt in the lines and conduits of prilling apparatus when the prilling process is interrupted for any reason. Another object is to provide prilling apparatus which permits rapid removal of melt from the lines and conduits of the prilling apparatus upon such interruption. A further object is to provide an improved process and apparatus for prilling molten solids. It is also an object of the invention to provide a method and apparatus for producing prills of substantially uniform size. Other objects will become apparent upon consideration of the accompanying disclosure.

One embodiment of the invention comprises auxiliary apparatus for terminating the flow of melt thru the prilling lines and conduits and simultaneously passing a hot high pressure flushing fluid thru the lines and conduits so as to flush the melt therefrom and back to the melt source. Another embodiment of the invention comprises sensing the pressure in the melt stream downstream of the prilling conduits or sprayer, maintaining a constant back pressure on said stream, and regulating the flow of melt into the spray conduits in response to the sensed pressure so as to maintain a constant pressure in the melt stream downstream of the spray conduits.

The invention will be better understood by reference to the accompanying drawing which is a flow diagram showing an arrangement of apparatus for effecting the invention.

Referring to the drawing a prilling tower 10 such as that disclosed in my copending application, S.N. 790,714, filed February 2, 1959, is provided with a prilling conduit or spray system 12 which is connected with a melt feed line 14 and a relief conduit 16 having a jacketed section 20 connecting the outlet of the prilling conduit system thru a three-way valve 18 with a constant head tank 22. Recycle line 24 extends into tank 22 to a fixed level 25 so as to maintain a constant head and back pressure on the melt in conduit 16. Line 24 is connected with a hot source of melt not shown which is the feed source for feed line 14. The flushing or purge system comprises air-operated three-way motor valve 18 which is connected with a line 26 for high pressure steam or other hot purge gas, a second air-operated three-way motor valve 28 and solenoid-operated three-way valves 30 and 32 in air lines 34 and 36, respectively, connecting with valves 18 and 28, respectively. Valve 32 vents to atmosphere thru line 38, valve 30 vents to atmosphere thru line 40 and valve 28 vents to atmosphere thru line 41. A third air-operated three-way valve 44 is positioned in line 16 adjacent tank 22 and is provided with a drain line 46. Air line 48, in which a solenoid operated three-way valve 50 is positioned, controls the operation of valve 44. Valve 50 is vented thru line 52.

Solenoids 54, 56, and 58 which operate valves 30, 32, and 50, respectively, are connected in parallel in electric circuit 60 which is provided with a source of current 62 and a switch 64.

The apparatus for controlling prilling pressure comprises air-operated motor valve 70 connected to pressure controller 72 by means of air line 74. Pressure controller 72 may be of any type which senses fluid pressure in a line or conduit and controls the operation of a valve in response thereto. In the embodiment shown in the drawing, pressure controller 72 is positioned in an instrument air line 76 which connects with relief conduit 16. Valves 78 and 80 have fixed orifices to limit the flow thru line 76 into conduit 16 and also from line 76 into line 74. A bellows 82 connects with line 76 thru line 84 downstream of valve 80 and operates thru contact arm 86 with rocker arm 88 which is pivoted at 90. The movement of rocker arm 88 relative to an orifice 92 in the end of line 94 controls the rate of bleeding air from line 94 and, therefore, the air pressure in line 74. With this arrangement, air is normally bled into relief conduit 16 thru line 76 at a constant rate because of constant pressure in instrument air line 76 and fixed orifice 80. When the pressure in conduit 16 increases above a predetermined value, an increase in air pressure in line 76 downstream of valve or orifice 80 is effected. This causes bellows 82 to act thru contact arm 86 to advance rocker arm 88 closer to orifice 92, thereby decreasing the rate of bleeding of air from instrument 72 and having the effect of increasing the air pressure in line 74 which cuts down on the opening of valve 70 so as to decrease the rate of flow of melt in line 14. This decrease in flow of melt, resulting from the sensed increase in pressure in conduit 16, restores the desired predetermined pressure in conduit 16. When the pressure in conduit 16 falls below the desired predetermined pressure, instrument 72 operates in the reverse manner to increase the bleeding rate of instrument air therefrom and lower the pressure in line 74 so as to open up valve 70 to compensate for the change in pressure in conduit 16.

A three-way solenoid-operated valve 96 is provided in line 74, including solenoid 98 and vent line 100. Solenoid 98 and vent line 100. Solenoid 98 is connected in circuit 60 in parallel with the solenoids previously described.

A solenoid operated three-way valve 102, provided with solenoid 106, is positioned in air-line 76 intermediate pressure controller 72 and relief conduit 16. This valve is connected with a high pressure purge gas line 104 which supplies high pressure air, steam, or other purge gas to the system as hereinafter described.

When it is necessary to terminate the prilling process for any reason, the opening of switch 64 operates the various solenoids in the circuit so that flow of melt thru line 16 into tank 22 is cut off and high pressure steam is injected into conduit 16 toward prilling conduit system or sprayer 12. Solenoid 54 operates valve 30 in instrument air line 34, thereby closing vent line 40 and allowing air to pass thru valve 30 to operate valve 18. Operation of solenoid 56 has a like effect on valve 32 so that valve 28 is opened to high pressure steam flow thru valve 18.

Simultaneously with the operation of the solenoids 54 and 56, solenoids 58, 98, and 106 operate the valves with which they are associated. Operation of valve 50 by solenoid 58 allows instrument air to operate thru line 48 on three-way valve 44 which opens line 16 between tank 22 and the valve to drain line 46, thereby allowing melt to drain from the tank. This prevents freeze up of the melt in tank 22. Operation of solenoid 98 cuts off the air-supply from line 76 to valve 70 and vents air in line 74 intermediate valve 96 and valve 70 thru vent line 100 thereby completely opening valve 70 so that high pressure steam passes thru conduit 16, sprayer 12, and feed line 14 to flush melt back into the melt tank which is the source of hot melt for the prilling process. During this forcing step the pump (not shown) in line 14 intermediate the melt tank and valve 70 is shut off to allow the back-flushing.

When solenoid 106 operates valve 102, flow of instrument air to line 16 is cut off and high pressure air or other suitable purge fluid is introduced from line 104 to line 76 downstream of valve 102 thereby purging line 76 of any melt which may have entered line 76 from conduit 16. The high pressure purge fluid flows back thru sprayer 12 and line 14, along with melt and steam as heretofore described.

The purge fluids in lines 26 and 104 should be under substantially the same presure. In one application a steam pressure of 40 p.s.i.g. was used successfully with good clearance of the melt lines, etc.

Of course, it is to be understood that the pump forcing melt thru line 14 is shut off and a valved line by-passing the pump is opened before the opening of switch 64 so that the melt purged from the lines and conduits of system can readily flow back to the melt tank without going thru the pump.

The section of conduit 16 between valve 18 and valve 44 is to be constructed as short as feasible and in the one installation is only about 18 inches long. This short section of conduit is jacketed by jacket 20 so that steam from any suitable source can be passed therethru so as to prevent freezing of the melt, or, if allowed to freeze, to liquefy the melt prior to the resumption of the prilling process. If desired, the inlet of jacket 20 may be connected by suitable valve and conduit arrangement with high pressure steam line 26 upstream of valve 28.

Certain modifications of the invention will become apparent to those skilled in the art and the illustrative details disclosed are not to be construed as imposing unnecessary limitations on the invention.

I claim:

1. In apparatus for spraying normally-solid molten material a prilling tower including a sprayer having droplet-forming orifices therein, a constant head tank, a relief conduit leading from said sprayer to said tank, and a supply line leading into said sprayer, means for purging said apparatus of molten material before same sets to a solid upon termination of the spraying process which comprises a high pressure flushing fluid line connected with said relief conduit near said tank thru a three-way air-operated motor valve; a three-way air-operated motor valve in said fluid flushing line; an instrument air line operatively connected to each of the aforesaid three-way motor valves; and a solenoid operated valve in each said instrument air line for controlling air flow to said motor valves to operate same.

2. The apparatus of claim 1 including a circuit connecting the solenoids of said valves with a power source and a switch in said circuit.

3. The apparatus of claim 2 including an air-operated motor valve in said relief conduit between said tank and first said three-way valve; an instrument air line operatively connected to last said motor valve; and a solenoid- operated three-way valve in said air line for controlling air flow to last said motor valve, the solenoid of last said valve being connected in said motor circuit.

4. Apparatus for spraying normally solid molten material comprising in combination a sprayer having droplet-forming orifices therein; a supply line leading into said sprayer having a flow control valve therein; a constant back-pressure control means; a relief conduit leading from said sprayer to said back-pressure control means; an instrument air line connected with said relief conduit adjacent said sprayer; a pressure controller in said instrument air line sensitive to pressure in said relief conduit in control of the valve in said supply line; a high pressure-fluid flushing line connected to said relief line intermediate said instrument air line and said back-pressure control means; valve means in said relief conduit near said back-pressure control means for cutting off flow of said material from said sprayer to said back-pressure control means and opening said fluid flushing line to said relief line.

5. The apparatus of claim 4 including a high pressure purge gas line and valve means in said instrument air line down stream of said pressure controller and connected to said purge gas line for closing said air line to flow from said controller and opening same to said purge gas line.

6. Prilling apparatus comprising a sprayer having orifices therein; a liquid supply line leading into said sprayer having a flow control valve therein; a liquid relief conduit leading from said sprayer; means for maintaining a constant back pressure in said relief conduit; a pressure controller sensitive to the pressure in said relief conduit in operative control of said flow control valve adapted to decrease flow when pressure in said relief conduit exceeds a predetermined minimum and to increase flow when said pressure is less than said minimum.

7. The apparatus of claim 6 wherein said means for maintaining a constant back pressure in said relief conduit comprises a constant head tank having a fixed overflow level therein.

8. Prilling apparatus comprising in combination a sprayer having droplet-forming orifices therein; a supply line leading into said sprayer; an air-operated motor valve in said supply line; a constant head tank connected with said sprayer by a relief conduit; a first three-way, air-operated motor valve in said relief conduit connected with a high pressure steam line; a second three-way, air-operated motor valve in said steam line vented to atmosphere; an instrument air line connected with each said first and second motor valves; a solenoid-operated valve in each said instrument air line for admitting and cutting off air to said first and second air-operated motor valves; an instrument air line connected with said relief conduit thru a pressure controller sensitive to the pressure in said relief conduit and in operative control of the motor valve in said supply line thru an air line therebetween; a three-way, solenoid operated valve in said instrument air line intermediate said pressure controller and said relief conduit connected with a high pressure purge gas line.

9. The apparatus of claim 8 including a solenoid-operated valve in the air line connecting said pressure controller with the motor valve in said supply line for cutting off air to said valve thereby fully opening same; a third three-way, air operated valve in said relief conduit adjacent the bottom of said tank connected with a drain line; a solenoid-operated valve in an instrument air line leading to said third three-way valve; a circuit connecting said solenoid-operated valves; a switch in said circuit; and a source of current in said circuit.

10. A process for controlling the prilling of a molten solid to maintain substantially constant prilling pressure and uniform prilling wherein said molten solid is flowed into a spray conduit and thru orifices therein into the top of a prilling tower which comprises flowing said molten solid thru a line into said spray conduit; passing excess molten solid thru a relief conduit from said spray conduit against a constant back pressure; sensing the pressure in said relief line; and as the pressure in said relief conduit varies, utilizing the sensed pressure to vary the flow rate thru said supply line and reestablish a predetermined fixed pressure in said relief conduit.

11. The process of claim 10 wherein said constant back pressure is maintained by passing said excess molten solid from said relief conduit into a storage chamber against a constant head.

12. The process of claim 10 wherein the pressure in said relief conduit is sensed by injecting air at a fixed rate into said relief conduit against the melt pressure therein; and utilizing the variation in pressure in the injected air to control the air pressure on an air operated motor valve in said supply line.

13. Prilling apparatus comprising a sprayer having an inlet in one side, an outlet at the opposite side, and droplet forming orifices along the bottom; constant back pressure means connected with said outlet by a relief conduit; a high pressure fluid purge line connected with said relief conduit close to said back pressure means thru valve means for cutting off flow thru said conduit to said back pressure means and admitting high pressure fluid into said conduit toward said sprayer; a melt supply conduit connected with said inlet having a flow-control valve therein; and means for opening said flow-control valve when said valve means admits flushing fluid to said relief conduit to permit flushing back thru said melt supply conduit.

References Cited in the file of this patent

UNITED STATES PATENTS

| | | |
|---|---|---|
| 1,587,529 | Hoyt | June 8, 1926 |
| 2,044,039 | Woodcock | June 16, 1936 |
| 2,528,407 | Yeandle | Oct. 31, 1950 |
| 2,747,224 | Koch et al. | May 29, 1956 |

UNITED STATES PATENT OFFICE
CERTIFICATE OF CORRECTION

Patent No. 2,994,101 August 1, 1961

Charles V. Mullen, Jr.

It is hereby certified that error appears in the above numbered patent requiring correction and that the said Letters Patent should read as corrected below.

Column 3, lines 68 and 69, after "material" insert -- into --.

Signed and sealed this 24th day of April 1962.

(SEAL)
Attest:

ESTON G. JOHNSON
Attesting Officer

DAVID L. LADD
Commissioner of Patents